United States Patent
Lei et al.

(10) Patent No.: US 9,844,083 B2
(45) Date of Patent: Dec. 12, 2017

(54) METHOD AND NETWORK ELEMENT FOR CONTROLLING UE'S STATE TRANSITION IN PROXIMITY WIRELESS COMMUNICATION

(71) Applicant: Nokia Technologies Oy, Espoo (FI)

(72) Inventors: Yixue Lei, Beijing (CN); Haitao Li, Beijing (CN); Vinh Van Phan, Oulu (FI); Ling Yu, Espoo (FI); Kari Veikko Horneman, Oulu (FI)

(73) Assignee: Nokia Technologies Oy, Espoo (FI)

( * ) Notice: Subject to any disclaimer, the term of this patent is extended or adjusted under 35 U.S.C. 154(b) by 12 days.

(21) Appl. No.: 14/650,842

(22) PCT Filed: Dec. 24, 2012

(86) PCT No.: PCT/CN2012/087307
§ 371 (c)(1),
(2) Date: Jun. 9, 2015

(87) PCT Pub. No.: WO2014/100941
PCT Pub. Date: Jul. 3, 2014

(65) Prior Publication Data
US 2015/0334754 A1    Nov. 19, 2015

(51) Int. Cl.
*H04W 4/00* (2009.01)
*H04W 76/02* (2009.01)
*H04W 8/00* (2009.01)
*H04W 76/04* (2009.01)

(52) U.S. Cl.
CPC ......... *H04W 76/023* (2013.01); *H04W 8/005* (2013.01); *H04W 76/046* (2013.01)

(58) Field of Classification Search
None
See application file for complete search history.

(56) References Cited

U.S. PATENT DOCUMENTS

| | | |
|---|---|---|
| 2008/0253312 A1 | 10/2008 | Park |
| 2011/0306352 A1 | 12/2011 | Young et al. |
| 2012/0082105 A1 | 4/2012 | Hwang et al. |

(Continued)

FOREIGN PATENT DOCUMENTS

| | | |
|---|---|---|
| CN | 102204392 | 9/2011 |
| CN | 102550117 | 7/2012 |

(Continued)

OTHER PUBLICATIONS

Chemmagate, "An Experimental Study of Web Transport Protocols in Cellular Networks", Thesis, Dec. 14, 2011, 75 pages.

(Continued)

*Primary Examiner* — Shantell L Heiber
(74) *Attorney, Agent, or Firm* — Mintz Levin Cohn Ferris Glovsky and Popeo, P.C.

(57) ABSTRACT

Disclosed are methods and apparatus for controlling state transition of a user equipment UE in proximity wireless communication. A method can comprise: learning about an associated agent's context of a connected UE and said UE's capability; deciding to put the connected UE into virtual associated state; sending to said UE a message with indication of putting said UE into said virtual associated state as well as the UE's context; and maintaining said associated agent's context of the UE.

18 Claims, 4 Drawing Sheets

(56) References Cited

U.S. PATENT DOCUMENTS

| | | | |
|---|---|---|---|
| 2012/0184282 A1 | 7/2012 | Malkamaki et al. | |
| 2012/0281566 A1* | 11/2012 | Pelletier | H04W 76/046 370/252 |
| 2013/0159522 A1* | 6/2013 | Hakola | H04L 63/0823 709/225 |
| 2015/0181491 A1 | 6/2015 | Van Phan et al. | |
| 2015/0208225 A1 | 7/2015 | Yu et al. | |
| 2015/0223106 A1 | 8/2015 | Van Phan et al. | |
| 2015/0289125 A1 | 10/2015 | Van Phan et al. | |

FOREIGN PATENT DOCUMENTS

| | | |
|---|---|---|
| EP | 2345299 A1 | 7/2011 |
| WO | 2010/025774 A1 | 3/2010 |
| WO | 2012/034580 A1 | 3/2012 |
| WO | 2012/087190 A1 | 6/2012 |

OTHER PUBLICATIONS

Extended European Search Report received for corresponding European Patent Application No. 12890706.0, dated Jul. 5, 2016, 8 pages.

International Search Report and Written Opinion received for corresponding Patent Cooperation Treaty Application No. PCT/CN2012/087307, dated Oct. 10, 2013, 11 pages.

\* cited by examiner

METHOD AND NETWORK ELEMENT FOR CONTROLLING UE'S STATE TRANSITION IN PROXIMITY WIRELESS COMMUNICATION

RELATED APPLICATION

This application was originally filed as PCT Application No. PCT/CN2012/087307 filed Dec. 24, 2012.

TECHNICAL FIELD

The exemplary and non-limiting embodiments of this invention relate generally to wireless communication technology, and more particularly, relate to controlling state transition of a user equipment UE in proximity wireless communication, in particular RRC (Radio Resource control) state transition for device-to-device (herein after referred to as "D2D") discovery and communication.

BACKGROUND

In recent, amount of traffic to be treated by cellular network increases as mobile multimedia services become popular. Especially, evolved nodeB (eNB) handles traffic more than in past years because of fast-growing needs of high data rate services. In pre-existing cellular networks, eNB should relay UEs' (User Equipment) data to core network even though users located in same cell coverage communicate with each other, which increases communication delay and burdens eNBs because of densely crowded users.

To solve this problem, device-to-device (D2D) communication has been introduced, which enables UEs to either reuse the frequency band used in pre-existing cellular network or use out-of-band frequency for direct communication with each other. D2D communication can reduce end-to-end delay and traffic load on eNBs.

FIG. 1 shows the wireless communication system 100 in which the D2D technology implements. As shown, the wireless communication system 100 includes an eNB 110 serving three UEs 114A-C and a core network 120 comprising conventional network nodes, such as MME (Mobility Management Entity) 112, S-GW (Serving Gateway) 116, P-GW (PDN Gateway) 118, HSS, etc.

It should be noted that, although FIG. 1 depicts only one eNB and three UES, it is only for the purpose of illustration and the wireless communication system 100 can accommodate any number of eNB(s) and UE(s).

In an exemplary scenario, UEs 114B and 114C which are being in communication via an infrastructure communication path 122A-C are being moved to be in close proximity to each other. Then, for example for the sake of power saving, cost saving, and/or offload of the core network etc., it may be necessary to switch the infrastructure communication path between them to a D2D communication path, for transporting traffic directly between the two UEs. In another exemplary scenario, two UEs 114A and 114B which are being in communication via a D2D communication path 124 are moved away from each other. Then, transport conditions of the D2D link 124 may become bad, so that the D2D communication path is not available between the two UEs. As such, to avoid communications between the two UEs being interrupted, the two UEs may have to switch the communications from the D2D communication path to other available communication path, such as an infrastructure communication path.

For network controlled or assisted D2D discovery and communication, at least one of the UEs involved in D2D may need to be kept in RRC_CONNECTED state for network control and mobility management. For autonomous D2D, the devices thereof may be in either RRC_IDLE or RRC_CONNECTED state.

However, since D2D may be deployed in a band separated from that of the controlling cell or serving network and it is important to keep control overhead as low as possible and utilize offloading possibility as much as possible for the serving network, there is a need to improve the current D2D discovery and communication procedure.

SUMMARY OF THE INVENTIONS

To overcome limitations in the prior art described above, and to overcome other limitations that will be apparent upon reading and understanding the present specification, the disclosure provides a method for controlling state transition of a user equipment UE in proximity wireless communication and related network element and computer program products.

According to a first aspect of the present invention, there is provided a method for controlling state transition of a user equipment UE in proximity wireless communication comprising: learning about an associated agent's context of a connected UE and said UE's capability; deciding to put the connected UE into virtual associated state; sending to said UE a message with indication of putting said UE into said virtual associated state as well as the UE's context; and maintaining said associated agent's context of the UE.

According to a second aspect of the present invention, there is provided an apparatus for controlling state transition of a user equipment UE in proximity wireless communication comprising: at least one processor; and at least one memory including computer program code, the at least one memory and the computer program code configured to, with the at least one processor, cause the apparatus to perform at least the following: learning about an associated agent's context of a connected UE and said UE's capability; deciding to put the connected UE into virtual associated state; sending to said UE a message with indication of putting said UE into said virtual associated state as well as the UE's context; and maintaining said associated agent's context of the UE.

According to a third aspect of the present invention, there is provided an apparatus for controlling state transition of a user equipment UE in proximity wireless communication comprising: learning means for learning about an associated agent's context of a connected UE and said UE's capability; deciding means for deciding to put the connected UE into virtual associated state; sending means for sending to said UE a message with indication of putting said UE into said virtual associated state as well as the UE's context; and maintaining means for maintaining said associated agent's context of the UE.

According to a fourth aspect of the present invention, there is provided a method for controlling state transition of a user equipment UE in proximity wireless communication comprising: reporting an associated agent's context to a base station to which said UE is connected; receiving from said base station a message with indication of putting said UE into virtual associated state as well as the UE's context; and switching to said virtual associated state while keeping associated with the said agent.

According to a fifth aspect of the present invention, there is provided an apparatus for controlling state transition of a user equipment UE in proximity wireless communication comprising: at least one processor; and at least one memory including computer program code, the at least one memory and the computer program code configured to, with the at least one processor, cause the apparatus to perform at least the following: reporting an associated agent's context to a base station to which said UE is connected; receiving from said base station a message with indication of putting said UE into virtual associated state as well as the UE's context; and switching to said virtual associated state while keeping associated with the said agent.

According to a sixth aspect of the present invention, there is provided an apparatus for controlling state transition of a user equipment UE in proximity wireless communication comprising: reporting means for reporting an associated agent's context to a base station to which said UE is connected; receiving means for receiving from said base station a message with indication of putting said UE into virtual associated state as well as the UE's context; and switching means for switching to said virtual associated state while keeping associated with the said agent.

The exemplary embodiments of the present invention further provide computer-readable storage mediums and computer program product, carrying one or more sequences of one or more instructions which, when executed by one or more processors, cause an apparatus to at least perform the steps of methods according to the first and second aspect of the exemplary embodiments of the present invention.

Those of skill in the art will appreciate that the above is merely an introduction to the subject matter described in more detail below. Other objectives, features and advantages of the present invention will appear from the following detailed disclosure, from the attached dependent claims as well as from the drawings.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF EXEMPLARY EMBODIMENTS

Figure 1:
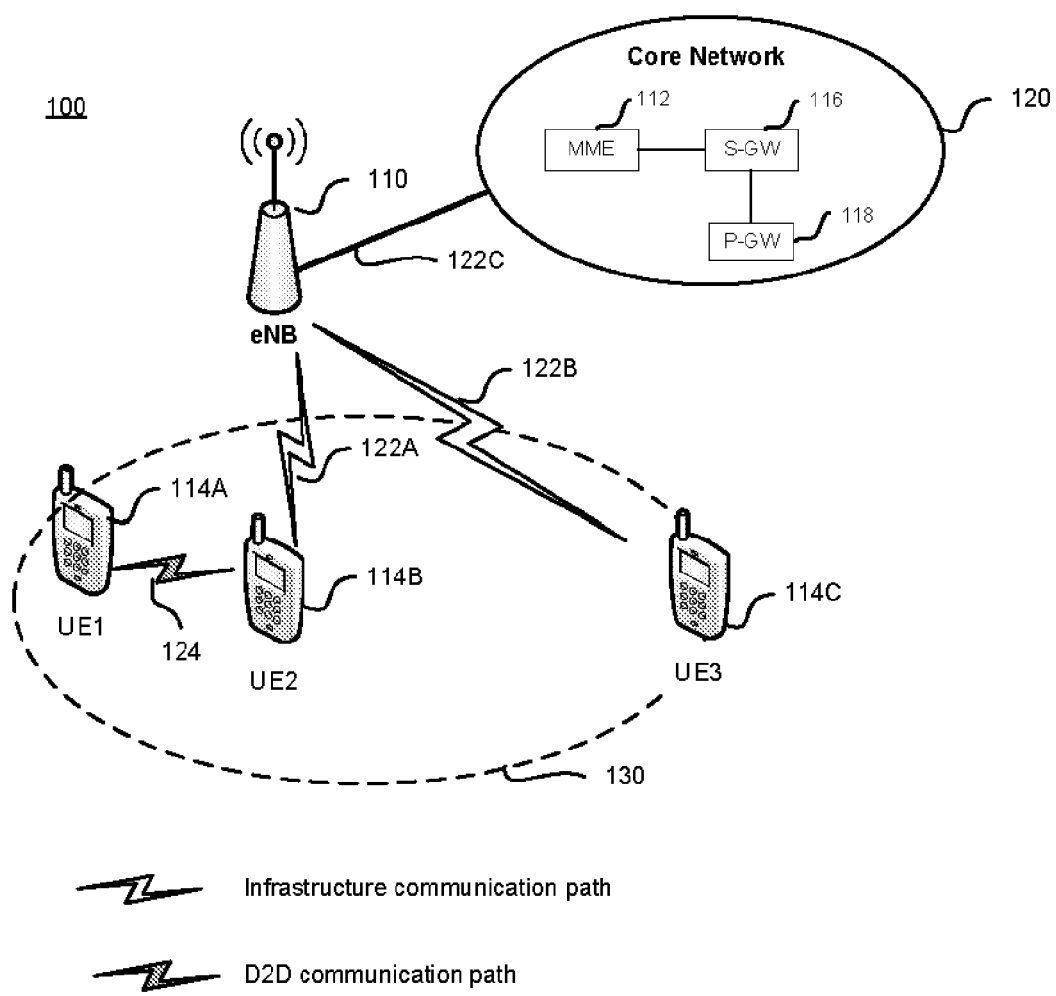
FIG. 1 shows a wireless communication system in which D2D can be implemented.

The basic idea of the present invention is to allow all the active devices involved in a network controlled D2D communication to get back to idle state of the serving network if there is some reliable, robust and efficient enough means in place: (i) for the devices to return to connected state of the serving network and (ii) for the serving network to reach the devices, both in a quick and efficient manner whenever e.g. UE reporting or network control is necessary. The means here may includes, e.g.: an existing association to a trusted local access point serving as a ProSe (Proximity Service) discovery agent or local U-plane connectivity or offloading agent for the serving cell and network (the agent can be fixed or stationary, or even mounted and moving together with the devices on bus, train, etc.); an association to another inter-operating network, also referred to as an 'agent' of the serving network; and some additional or enhanced network configuration means to configure and manage the proposed RRC state transition of the UEs for D2D. This kind of special idle state may be referred to as a 'virtual associated' state. Else, at least one of the devices is kept in RRC CONNECTED state. For serving network to reach the devices, it can be done through its associated agent(s) in a light and cost saving way, which will be different from the legacy way as flood-based paging approach. This is thanks to the associated agent(s) context maintained in the network side.

The serving cell (or network) determines whether to push some or all of the devices involved in the network controlled D2D of interest into the 'virtual associated' state based on whether such the aforementioned means is in place, as the network may learn such that in advance. The network may also delegate such control to one of the UEs to trigger RRC state transmission in case this UE acts as a cluster header among D2D UE clusters. This decision making may of course consider other factors such as capabilities, states or statuses and conditions of the serving network and individual user devices. The network may then issue e.g. a control message to configure the relevant UEs, either individually or commonly as group-wise, with necessary control information (e.g., to communicate at least part of the UE context of the 'virtual associated' state as proposed below) and put the UEs to the 'virtual associated' state. Note that the existing RRC Connection Reconfiguration or Release procedure may be reused and extended for implementing this state transition.

The network learns about the association based on reporting from the individual UEs about their association to some preconfigured or selected agents, or other way around, reporting from the agents about the UE associated to it. After D2D discovery and setup, when state transition is needed, UEs are in RRC Connected state to support the reporting and triggering of transition. Note that, the agent in this invention may have both implementation and standard possibilities. For some examples, thinking of Wi-Fi or existing cellular RATs (Radio Access Technologies) then the agent can be of existing access node(s) of the same or different RANs which inter-operate with the serving one and the association between UE and agent may therefore be based upon the existing procedures. For some other examples, thinking of enhanced local access point for future mobile broadband network or device acting as agent, agent association and assistance on the RRC state transmission may be optimized and standardized.

UE context of the 'virtual associated' state may include for example: IDs of associated agent(s), Radio Network Temporary Identifiers (RNTIs) of UE valid to access the agent(s) (including other inter-operating network) or directly to the serving cell, how often or upon which event UE needs to report to the serving network and the access may be initiated via the agent, another network or directly to the serving network, how the UE needs to monitor network-initiated control signaling and how to response to that, etc. These rules are configured and controlled by the network.

UE context of the 'virtual associated' state may be updated and synchronized between the individual UE and the network with or without assistance of the associated agent. The UE may update the association agent context by itself upon detecting a new suitable agent and successfully associating to that (agent reselection, as configured and controlled by the network via preconfigured reselection criteria, rules or policies as well as constraints). Then either the new agent may take charge in reporting and updating the network of the new agent context for the UE or the UE may report that to the network by itself via the new agent. In the case that the UE detects that the current agent association is no longer valid and no new suitable agent is found, the UE need to get back to RRC CONNECTED via regular IDLE UE procedure, indicating or reporting that cause to the network. The network may then update the UE state and keep it in RRC CONNECTED.

The release of the 'virtual associated' state in the network side may be triggered by the report from the agents that the UE's association to it has changed. In this case, the network may need to use the normal network initiated procedure to regain the control of the UE on the cell level. Or if network learns about the association based on reporting from the individual UEs, UE may report the change of association status of the agents with the normal idle mode UE initiated procedure with the information of the 'virtual associated' state UE context. In this case, the release of the 'virtual associated' state may result in the state transition to RRC CONNECTED state for the UE in the network side.

Figure 2:
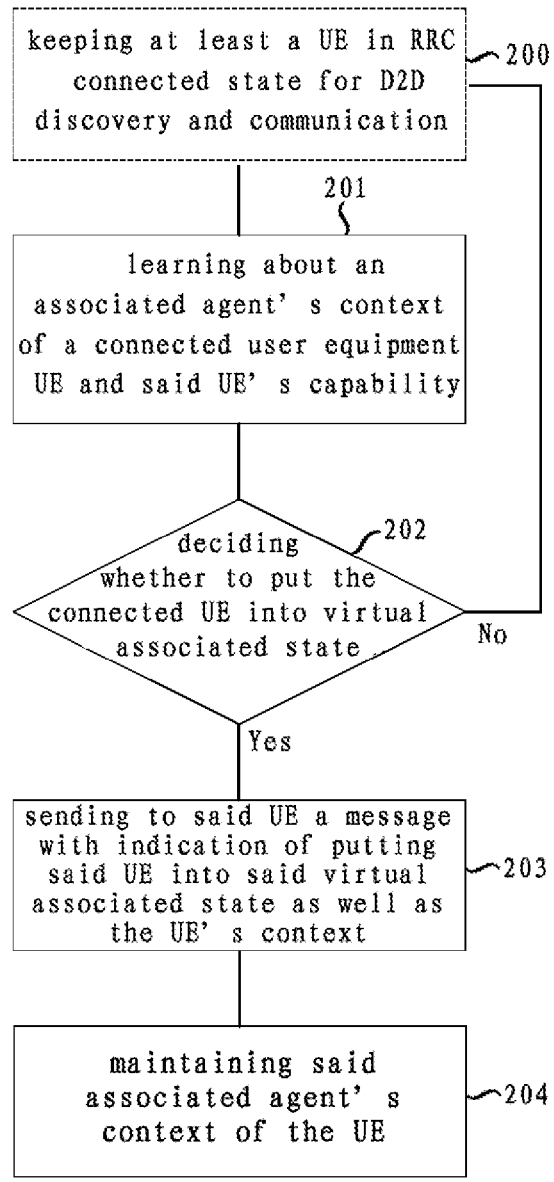
FIG. 2 is a flowchart of the method for controlling state transition of a UE in proximity wireless communication according to an embodiment of the present invention.

In some certain aspects, this invention proposes an adaptive use of mechanisms which are applied in long DRX state in RRC CONNECTED and RLF recovery via RRC IDLE and now extended and enhanced with possibility of using configured out-of-band agent(s). The introduced 'virtual associated' state can be considered as some state in between the current RRC CONNECTED and RRC IDLE states. That the network may put the devices (stationary ones, immobile in relation to an access-point agent which can be fixed or mounted on a moving vehicle) into RRC IDLE or long DRX in RRC CONNECTED but with certain CONNECTED context such as UE context of the 'virtual associated' state (to allow the eNB to control the devices on the serving cell level using the context) or otherwise the eNB may need to be informed of IDLE UE context by the means introduced above (to be able to initiate control of the devices right away without MME involved) can be considered as boundary or fall-back operations of the proposed adaptive method. The main operation is to put the devices into the 'virtual associated' state with the agent contexts, as described above. FIG. 2 provides an illustration of some aspects of the proposed method.

Preferably, the various embodiments of the present invention may be implemented for example in such an environment as shown in FIG. 1.

It should be noted that, in some implementations, the base station 110 as shown in FIG. 1, which can be implemented as an evolved Node B (eNB) type base station, consistent with standards, including the Long Term Evolution (LTE) standards. The user equipments 114A-C may be mobile and/or stationary. Moreover, the user equipments 114A-C may be referred to as, for example, devices, mobile stations, mobile units, subscriber stations, wireless terminals, terminals, or the like. The user equipments may be implemented as, for example, a wireless handheld device, a wireless plug-in accessory, or the like. For example, the user equipment may take the form of a wireless phone, a computer with a wireless connection to a network, or the like. In some cases, the user equipment may include one or more of the following: at least one processor, at least one computer-readable storage medium (e.g., memory, storage, and the like), a radio access mechanism, and a user interface.

It should be also noted that, in some implementations, the wireless communication system 100 can be configured to comply substantially with a standard system specification, such as 3GPP UTRAN or EUTRAN or other wireless standards, such as WiBro, WiFi, Bluetooth, IEEE 802.16, or it may be a proprietary system. For example, the wireless communication system 100 may include two kinds of communication paths for communications between two user equipments. One is an infrastructure communication path which is routed over a network infrastructure such as communication links 122A-C, between the user equipment 114B and the user equipment 114C. The links 122A and 122B each represents radio access links between the user equipments and access nodes of the radio access network, such as an eNB. The link 122C represents a link between the radio access network and the core network. For example, the links 122A-C may be configured as cellular communication links in accordance with LTE and/or LTE-Advanced. The other kinds of communication paths for communications between two user equipments can be a D2D communication path which is routed directly between two user equipments without using any network infrastructure, such as a communication link 124 between the user equipment 114A and 114B. For example, links 124 may be configured as D2D links in accordance with WiFi or Bluetooth. D2D communication links may be incorporated in public land mobile systems, such as the 3rd Generation Partnership Project (3GPP) as well as subsequent generations of wireless systems to provide cellular controlled D2D communications. The cellular system, such as the eNB 110 or MME (Mobility Management Entity) and SGW (serving gateway), may be used to aid in the establishment and ongoing control of the D2D links 124 (e.g., radio resources by the D2D links, switch control, etc).

An exemplary embodiment of the present invention will be hereinafter described with reference to the drawings.

Now with reference to FIG. 2, the method for controlling state transition of a user equipment UE in proximity wireless communication will be described hereinafter in combination with the environment shown in FIG. 1. In the present embodiment, the proximity wireless communication is for example the device-to-device discovery and communication procedure, and said method can be implemented for example in a base station, such as eNB 110 as shown in FIG. 1.

As shown in FIG. 2, first of all, said UE is kept in the connected state in step 200, in case that there is not an agent associated with said UE or said UE is not equipped with capability about the virtual associated state. Herein, said UE may be for example UE 114A as shown in FIG. 1. Furthermore, the states of said UE comply with for example the Radio Resource Control RRC states.

As mentioned above, the agent in this invention may have both implementation and standard possibilities. For some examples, thinking of Wi-Fi or existing cellular RATs then the agent can be of existing access node(s) of the same or different RANs which inter-operate with the serving one and the association between UE and agent may therefore be based upon the existing procedures. For some other examples, thinking of enhanced local access point for future mobile broadband network or device acting as agent, agent association and assistance on the RRC state transmission may be optimized and standardized.

Next, in step 201, an associated agent's context of a connected UE and said UE's capability are learned about.

For example, either UE 114A reports to eNodeB 110 about its association with said agent, or the associated agent reports to the base station about UE 114A being associated with it.

Herein, the association between said UE and said agent is a physical association, which means either discovering the agent by physical signal or establishing the physical connection with the agent. Note that, the term "physical" is only intended to distinguish from association to agents on application layer, but not limit the invention. In particular, the term "physical signal" means that the UE detect the agent based on the signal transmitted by the agent; and the term "physical connection" means that the UE set up a direct connection with an agent (i.e. the connection between the UE and the agent is not via another network element).

Next, in step 202, a decision is made about whether to put the connected UE into virtual associated state. If yes, for example UE 114A has successfully associated to an agent, then the method proceeds to step 203; otherwise the method returns to step 200.

Note that in said virtual association state, said UE gets back to idle state while keeping associated with said agent.

Next, in step 203, a message with indication of putting said UE into said virtual associated state as well as the UE's context is sent to the UE. In the present embodiment, said message is for example either a RRC connection release message or a RRC connection reconfiguration message, in which said indication is added, for example with the extended Information Element(s) of these messages. Said indication may be either explicitly included or implicitly with the extra UE virtual associated state context information. Optionally, said message can further comprise for example context of said UE related to the virtual associated state.

Finally, in step 204, said associated agent's context of the said UE is maintained. In the present embodiment, said maintaining can comprise: when the UE detected a new agent and is successfully associated with it, either the UE updating and reporting to the base station, either directly or via an agent (either its older agent of its new agent), its new association agent context; or the UE updating its new association agent context locally and then the new agent reporting to the base station the new agent context for the UE.

It should be note that, if the base station has received a report from the agent indicating that the UE's association to it is no longer valid and does not receive, for a certain period, any report from other agents indicating that the UE associates to it, then the release of the virtual associated state is initiated by the base station. OR, if the network learns about the association based on reporting from the UE directly, the UE reports release of association status of any agent with the normal idle mode UE initiated procedure and triggers the release of the virtual associated state in the base station.

Figure 3:
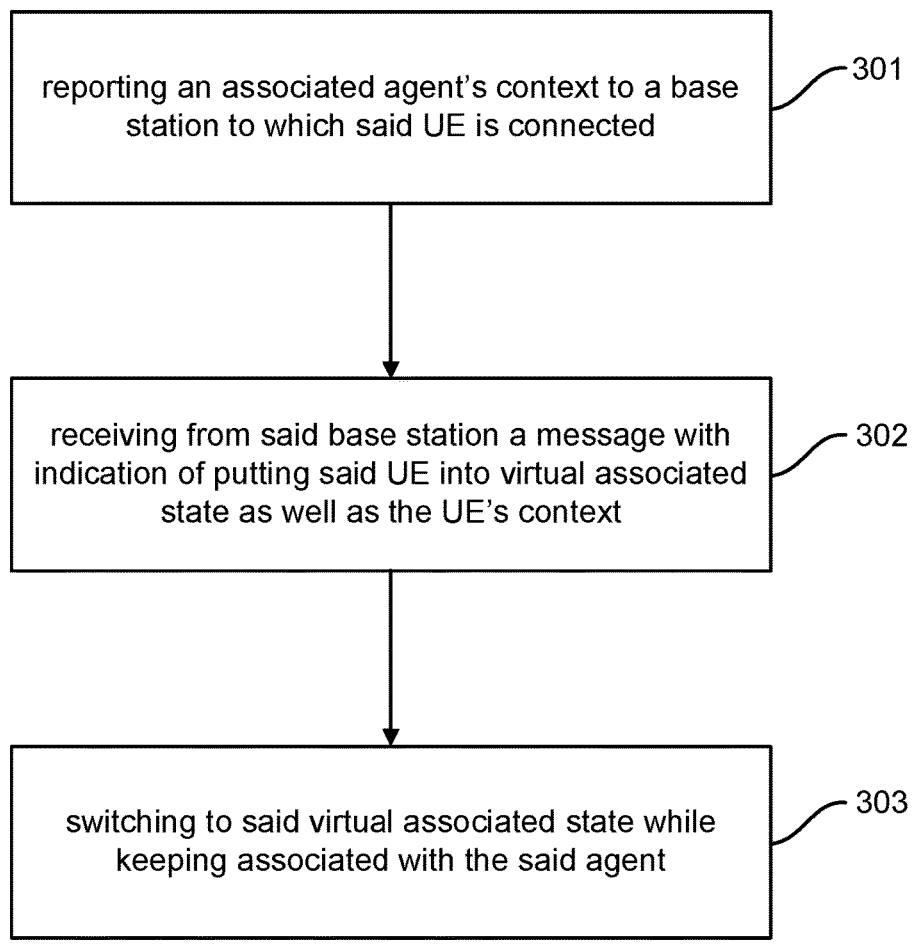
FIG. 3 a flowchart of the method for controlling state transition of a UE in proximity wireless communication according to another embodiment of the present invention.

FIG. 3 illustrates another embodiment of the method for controlling state transition of a user equipment UE in proximity wireless communication, which can be implemented for example by a UE.

In step 301, the UE reports to a base station to which it is connected about an associated agent's context. For example, UE 114A reports to eNodeB 110 about its association with said agent.

Next, in step 302, the UE receives from said base station a message with indication of putting said UE into virtual associated state as well as the UE's context. In the present embodiment, said message is for example either a RRC connection release message or a RRC connection reconfiguration message, in which said indication is added, for example with the extended Information Element(s) of these messages. Said indication may be either explicitly included or implicitly with the extra UE virtual associated state context information. Optionally, said message can further comprise for example context of said UE related to the virtual associated state.

Finally, in step 303, the UE switches to said virtual associated state while keeping associated with the said agent.

The various blocks shown in FIGS. 2-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown. The solution provided by the present invention can help the network to reach the devices through its associated agent(s) in a light and cost saving way, based on the associated agent(s) context maintained in the network side, which will be different from the legacy way as flood-based paging approach.

Figure 4:
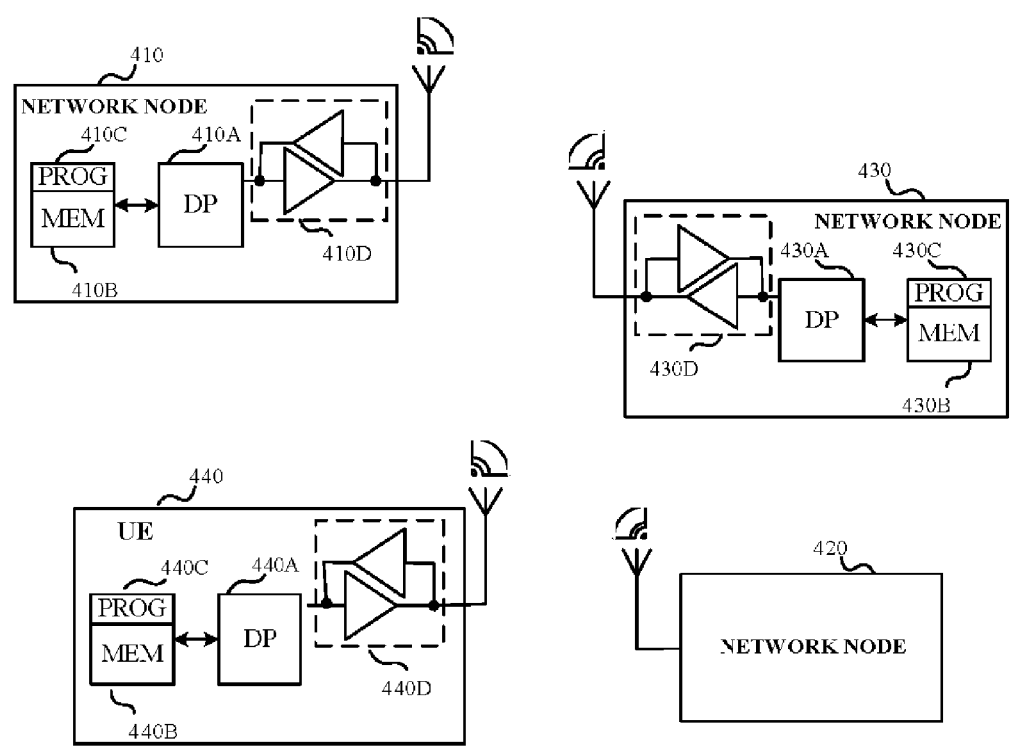
FIG. 4 is a simplified block diagram of various apparatuses which are suitable for use in practicing exemplary embodiments of the present invention.

FIG. 4 is a simplified block diagram of various apparatuses which are suitable for use in practicing exemplary embodiments of the present invention. In FIG. 4, a UE 440 (such as mobile phone, wireless terminal, portable device, PDA, multimedia tablet, and etc.) may be adapted for communicating with one or more network nodes such as a first network node 410, a second network node 420 and a third network node 430. The first network node 410 (such as a BS/eNB etc.), the second network node 420 (such as a BS/eNB etc.) and the third network node 430 (such as a BS/eNB etc.) may be adapted for communicating with each other directly or through a network entity such as a Mobility Management Entity (MME) or other intermediate entity in a core network (not shown in FIG. 4). In an exemplary embodiment, the UE 440 may comprise a data processor (DP) 440A, a memory (MEM) 440B that stores a program (PROG) 440C, and a suitable transceiver 440D for communicating with an apparatus such as another UE, a network node, a server and so on. The first network node 410 may comprise a data processor (DP) 410A, a memory (MEM) 410B that stores a program (PROG) 410C, and a suitable transceiver 410D for communicating with an apparatus such as the second network node 420, the third network node 430, a UE 440 or a network entity (not shown in FIG. 4). Similarly, the third network node 430 may comprise a data processor (DP) 430A, a memory (MEM) 430B that stores a program (PROG) 430C, and a suitable transceiver 430D for communicating with an apparatus such as the first network node 410, the second network node 420, the UE 440 or a network entity (not shown in FIG. 4). It is noted that the second network node 420 may have components or means similar to the first and the third network nodes although not shown in FIG. 4. For example, at least one of the transceivers 410D, 430D, 440D may be an integrated component for transmitting and/or receiving signals and messages. Alternatively, at least one of the transceivers 410D, 430D, 440D may comprise separate components to support transmitting and receiving signals/messages, respectively. The respective DPs 410A, 430A and 440A may be used for processing these signals and messages.

Alternatively or additionally, the UE 440, the first network node 410 and the third network node 430 may comprise various means and/or components for implementing functions of the foregoing steps and methods in FIGS. 1-2. For example, the UE 440 may comprise: reporting means for reporting an associated agent's context to a base station to which said UE is connected; receiving means for receiving from said base station a message with indication of putting said UE into virtual associated state as well as the UE's context; and switching means for switching to said virtual associated state while keeping associated with the said agent. In an exemplary embodiment, the first network node 410 may comprise: learning means for learning about an associated agent's context of a connected UE and said UE's capability; deciding means for deciding to put the connected UE into virtual associated state; sending means for sending to said UE a message with indication of putting said UE into said virtual associated state as well as the UE's context; and maintaining means for maintaining said associated agent's context of the UE.

At least one of the PROGs 410C, 430C, 440C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 410A of the first network node 410, by the DP 430A of the third network node 430 and by the DP 440A of the UE 440, or by hardware, or by a combination of software and hardware.

The MEMs 410B, 430B and 440B may be of any type suitable to the local technical environment and may be implemented using any suitable data storage technology, such as semiconductor based memory devices, flash memory, magnetic memory devices and systems, optical memory devices and systems, fixed memory and removable memory. The DPs 410A, 430A and 440A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

The invention claimed is:

1. An apparatus, comprising:
   at least one processor; and
   at least one memory including computer program code,
   the at least one memory and the computer program code configured to, with the at least one processor, cause the apparatus to at least:
      determine that a user equipment is associated with an agent, the user equipment being associated with the agent by at least being connected to the agent;
      in response to the determination that the user equipment is associated with the agent, transition the user equipment into a virtual associated state, the virtual associated state comprising a state in which the user equipment is connected to the agent while in an idle state, the transition causing a message to be sent to the user equipment, the message including an indication for the user equipment to transition into the virtual associated state; and
      maintain a context of the user equipment, the context of the user equipment including the agent associated with the user equipment.

2. The apparatus according to claim 1, wherein the user equipment is connected to the agent directly via a physical association, and wherein the user equipment establishes the physical association by at least discovering the agent by physical signal and establishing the physical connection with the agent.

3. The apparatus according to claim 1, wherein the apparatus is further caused to at least:
   receive from the user equipment and/or the agent, a report that the user equipment is associated with the agent, the determining that the user equipment is associated with the agent being based at least on the report.

4. The apparatus according to claim 1, wherein the user equipment responds to the message by at least a transition to the virtual association state, the transition to the virtual association state comprising a transition to the idle state while an association with the agent is maintained.

5. The apparatus according to claim 1, wherein the apparatus is further caused to at least:
   determine that the user equipment is associated with a new agent; and
   update the context of the user equipment, the update comprising a change of the agent associated with user equipment to the new agent.

6. The apparatus according to claim 1, wherein the apparatus is further caused to at least:
  initiate a release of the virtual associated state, the release of the virtual associated state being initiated in response to a report from the agent indicating that the user equipment is no longer associated with the agent, and the release of the virtual associated state being initiated further in response to an absence of a report from another agents indicating a different association between the other agent and the user equipment.

7. The apparatus according to claim 1, wherein the apparatus is further caused to at least:
  initiate a release of the virtual associated state in response to an idle mode procedure initiated by the user equipment, the initiation of the idle mode procedure indicating that the user equipment is no longer associated with the agent.

8. The apparatus according to claim 1, wherein the agent comprises a local access point serving as a proximity service discovery agent, a local user plane connectivity agent, and/or an offloading agent.

9. A method, comprising:
  reporting, to a base station to which the user equipment is connected, that the user equipment is associated with an agent, the user equipment being associated with the agent by at least being connected to the agent;
  receiving, from the base station, a message with indication for the user equipment to transition into a virtual associated state, the virtual associated state comprising a state in which the user equipment is connected to the agent while in an idle state; and
  transitioning, in response to the message, into the virtual associated state, the transition into the virtual associated state comprising a transition into the idle state while an association with the agent is maintained.

10. The method according to claim 9, wherein the user equipment is connected to the agent directly via a physical association, and wherein the user equipment establishes the physical association by at least discovering the agent by physical signal and establishing the physical connection with the agent.

11. The method according to claim 9, wherein the user equipment is kept in the connected state when the user equipment is not associated with any agent and/or when the user equipment is not equipped with a capability for the virtual associated state.

12. The method according to claim 9, wherein the message further comprises a context of the user equipment, the context of the user equipment including the agent associated with the user equipment.

13. The method according to claim 12, wherein the context of the user equipment an identifier of the agent, a radio network temporary identifier of the user equipment, a frequency of reports to a serving network, one or more events that trigger reports to the serving network, and/or a requirement to monitor network-initiated control signaling.

14. The method according to claim 9, wherein proximity wireless communication comprises a device-to-device discovery and communication procedure.

15. An apparatus for controlling state transition of a user equipment in proximity wireless communication, comprising:
  at least one processor; and
  at least one memory including computer program code,
  the at least one memory and the computer program code configured to, with the at least one processor, cause the apparatus to at least:
    report, to a base station to which the user equipment is connected, that the user equipment is associated with an agent, the user equipment being associated with the agent by at least being connected to the agent;
    receive, from the base station, a message with indication for the user equipment to transition into a virtual associated state, the virtual associated state comprising a state in which the user equipment is connected to the agent while in an idle state; and
    transition, in response to the message, into the virtual associated state, the transition into the virtual associated state comprising a transition into the idle state while an association with the agent is maintained.

16. The apparatus according to claim 15, wherein the message is at least one of a radio resource control connection release message and a radio resource control connection reconfiguration message.

17. The apparatus according to claim 15, wherein the apparatus is further caused to at least:
  establish a different association with another agent and
  send, to the base station, a report indicating the different association with the other agent, the message configured to cause the base station to update a context of the user equipment, the context of the user equipment being maintained at the base station, the context of the user equipment including the agent associated with the user equipment, and the context of the user equipment being updated to include the other agent associated with the user equipment.

18. The apparatus according to claim 15, wherein the context of the user equipment includes an identifier of the agent, a radio network temporary identifier of the user equipment, a frequency of reports to a serving network, one or more events that trigger reports to the serving network, and/or a requirement to monitor network-initiated control signaling.

* * * * *